United States Patent [19]
Taguchi et al.

[11] Patent Number: 5,462,571
[45] Date of Patent: Oct. 31, 1995

[54] NOZZLE TIP FOR SPINNING GLASS FIBER HAVING DEFORMED CROSS-SECTION AND A PLURALITY OF PROJECTIONS

[75] Inventors: Hideo Taguchi, Nihonmatsu; Kozo Shioura; Miwa Sugeno, both of Fukushima, all of Japan

[73] Assignee: Nitto Boseki Co., Ltd., Fukushima, Japan

[21] Appl. No.: 162,440

[22] Filed: Dec. 3, 1993

[30] Foreign Application Priority Data

Dec. 7, 1992 [JP] Japan .................................. 4-326677

[51] Int. Cl.$^6$ ................................................ C03B 37/022
[52] U.S. Cl. ................................. 65/437; 65/497; 65/495
[58] Field of Search ........................... 65/1, 2, 11.1, 495, 65/497, 437

[56] References Cited

U.S. PATENT DOCUMENTS

| | | | |
|---|---|---|---|
| 2,489,508 | 11/1949 | Stalego | 65/1 |
| 2,578,986 | 12/1951 | Schoonenberg et al. | 65/11.1 |
| 3,475,147 | 10/1969 | Stalego | 65/1 |
| 4,473,386 | 9/1984 | Strickland | 65/1 |

FOREIGN PATENT DOCUMENTS

| | | |
|---|---|---|
| 0069601 | 1/1983 | European Pat. Off. . |
| 0108021 | 5/1984 | European Pat. Off. . |
| 0196194 | 10/1986 | European Pat. Off. . |
| 61-219732 | 9/1986 | Japan . |
| 62-187136 | 8/1987 | Japan . |
| 62-187137 | 8/1987 | Japan . |

*Primary Examiner*—W. Gary Jones
*Assistant Examiner*—John Hoffmann
*Attorney, Agent, or Firm*—Darby & Darby

[57] ABSTRACT

The invention provides a nozzle tip for manufacturing a glass fiber having a deformed cross-section which is of a large deformation ratio in the cross-section. A plurality of projected edges are provided to extend downwardly from the distal end of a nozzle tip at its outer periphery. Molten glass coming out of an orifice is separated at an outlet of the orifice into a flow descending from the orifice center and flows descending along inner walls of the projected edges, and the flow descending from the orifice center is attracted toward the flows descending along the inner walls of the projected edges. As a result, a glass fiber having a deformed cross-section is produced which is protruding in its portions corresponding to the projected edges. The cross-section of the glass fiber produced by using the present nozzle tip has a deformation ratio not less than 2.3.

9 Claims, 10 Drawing Sheets

FIG. I
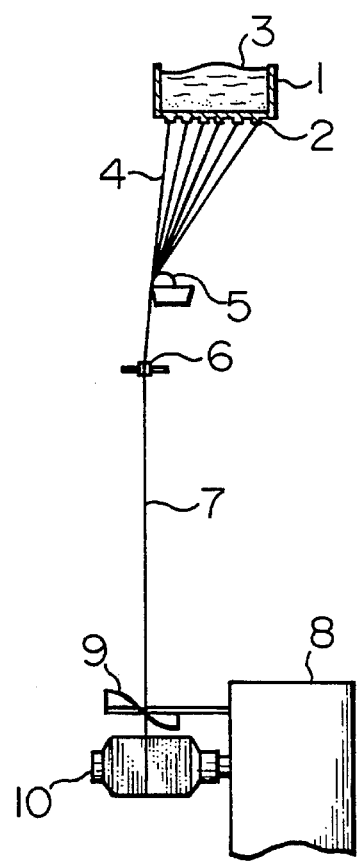
FIG. 2
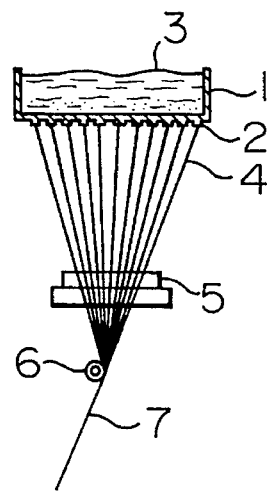

5,462,571

NOZZLE TIP FOR SPINNING GLASS FIBER HAVING DEFORMED CROSS-SECTION AND A PLURALITY OF PROJECTIONS

FIELD OF THE INVENTION

The present invention relates to a nozzle tip for spinning a glass fiber having a deformed cross-section, i.e., a non-circular cross-section, for use with reinforced plastics, particularly thermoplastic resins, the glass fiber having a deformed cross-section which is spun by using the nozzle tip, and a method of spinning the glass fiber having a deformed cross-section by the nozzle tip.

DESCRIPTION OF THE RELATED ART

Hitherto, several methods have been disclosed for manufacturing glass fibers having deformed cross-sections. For example, Japanese Patent Unexamined Publication No. 62-187137 discloses a method of using nozzles which are not circular in their cross-sections, but elliptic, cocoon-shaped or like. Also, Japanese Patent Unexamined Publication No. 61-219732 discloses a manufacturing method whereby a plurality of orifices are arranged close to each other, and a plurality of molten glass filaments spun through the orifices are joined together into a glass fiber at the point where a glass temperature is lowered to some extent and its viscosity is increased correspondingly. Further, Japanese Patent Unexamined Publication No. 62-187136 discloses a method which utilizes a nozzle tip for the purpose of improving a workability of the method disclosed in Japanese Patent Unexamined Publication No. 61-219732.

Glass fibers are generally manufactured by spinning molten glass from a bushing formed with a number of nozzles. At this time, the molten glass in the bushing is at a high temperature of about 1200° C. and has a viscosity of about 1000 poise. When the molten glass having such a low viscosity and a high surface tension is drawn at high speeds to spin a glass fiber having a deformed cross-section, the glass fiber immediately after the spinning tends to become circular in its cross-section by being subjected to the high surface tension and mechanical elongating forces applied from a winder, even if the nozzle having a non-circular cross-section as disclosed in Japanese Patent Unexamined Publication No. 62-187137 is used. Thus, it is difficult to stably produce a glass fiber having a deformed cross-section. In the method disclosed in Japanese Patent Unexamined Publication No. 62-187136, the molten glass filaments coming out of the plural orifices are joined together in a very short time and, therefore, careful attention is required in setting a spacing between the plural orifices. If the orifice spacing is too small, the cross-section of the joined filament would be apt to become circular. Conversely, if it is too large, the molten glass filaments would not be joined together, resulting in plural separate filaments each having a circular cross-section. To cope with such a problem, it has been proposed that the surface in which the plural orifice are opened is made concave. However, this modified method also has limitations on a transformation (maximum length/minimum width) ratio of the fiber cross-section because allowable ranges of the orifice spacing and a slope angle of the concave surface are restricted.

Glass flakes, glass fibers, and a mixture of glass flakes and glass fibers have been widely used as reinforcements for thermoplastic resins or the like for the purposes of improving mechanical properties, such as bending strength, bending elasticity and Izod impact strength, of moldings in which the reinforcements are employed, improving dimensional stability by such means as of making a molding shrinkage rate in the direction of a resin flow and a molding shrinkage rate in the direction perpendicular to the resin flow almost equal to each other (i.e., reducing an anisotropy of the shrinkage rate) and also reducing the shrinkage rate itself, increasing a thermally deforming temperature, as well as providing a good appearance of moldings free from surface ruggedness, roughness, raised reinforcements and so on.

While using glass flakes as reinforcements is advantageous in that an anisotropy of the shrinkage rate is small and so is an anisotropy of the coefficient of linear expansion, thus making moldings free from warps, and that a good appearance is resulted from being less subjected to surface ruggedness, roughness and raised reinforcements in moldings, there accompany problems below. Mechanical properties such as bending strength, bending elasticity and Izod impact strength are little improved, and absolute values of the shrinkage rate and the coefficient of linear expansion are not within satisfactory ranges.

In the case of using glass fibers in the form of chopped strands, as an amount of the glass fibers filled is increased, mechanical properties such as bending strength, bending elasticity and Izod impact strength, and the shrinkage rate are improved, but an anisotropy of resin materials is enlarged. With regard to dimensional stability, for example, the coefficient of linear expansion and the molding shrinkage rate can be both reduced in the direction of a resin flow during the molding, but not reduced in the direction perpendicular to the resin flow in spite of increasing an amount of the glass fibers filled. Therefore, a sufficient dimensional stability is not achieved for practical products, and severe restrictions give rise to in mold design concerned with a resin gate position, for example, and product design.

Up to date, there have not been practiced those reinforcements which can provide resin materials with a very small anisotropy and very superior mechanical properties, i.e., which can produce resin materials that mechanical properties are high (enough to endure tightening of bolts, bear the machine weight, and make the materials less susceptible to vibrations) for use with business machines, particularly copying and facsimile machines, and an appearance is good; in particular, dimensional stability is very superior in both the direction of a resin flow and the direction perpendicular to the resin flow as represented by the small coefficient of linear expansion (meaning small dimensional changes depending on ambient temperatures) and the small molding shrinkage rate (meaning small errors between design sizes and actual sizes of moldings, which result in small variations of molding sizes).

SUMMARY OF THE INVENTION

With a view of solving the above-mentioned problems in the prior art methods, an object of the present invention is to provide a glass fiber having a flattened, polygonal or other deformed cross-section, particularly a glass fiber having such a cross-section as being oval, elliptic or cocoon-shaped so that a deformation ratio of the cross-section is large, a nozzle tip for spinning the glass fiber having a deformed cross-section by which the glass fiber having a deformed cross-section can be stably spun with less frequency of fiber breakage during the spinning, and a method of manufacturing the glass fiber having a deformed cross-section by using the nozzle tip.

To achieve the above object, according to the present invention, a nozzle tip for spinning a glass fiber having a deformed cross-section is featured in that a plurality of projected edges are provided on the nozzle tip, which includes one or plural orifices, to extend downwardly from the distal end of the nozzle tip at its outer periphery. A glass fiber having a deformed cross-section produced by using the above nozzle tip is featured in that a ratio of maximum length to minimum width in the fiber cross-section is not less than 2.3. Further, a method of manufacturing the glass fiber having a deformed cross-section is featured in that molten glass is forced to flow out of the above nozzle tip.

FIG. 3 shows a nozzle tip with one orifice for spinning a conventional glass fiber having a circular cross-section. While being subjected to elongating forces applied from a winder, molten glass flowing out of the orifice forms a cone and is spun into a fiber having a circular cross-section.

On the other hand, FIG. 4 shows one embodiment of the present invention in which, with the provision of projected edges 14 extending downwardly from the distal end of a nozzle tip 12 at its outer periphery, molten glass coming out of an orifice 13 is separated at an outlet of the orifice into a flow descending from the orifice center and flows descending along inner walls of the projected edges 14, and the flow descending from the orifice center is attracted toward the flows descending along the inner walls of the projected edges. At the distal ends of the projected edges, therefore, the molten glass becomes non-circular in cross-section such that its portions corresponding to the projected edges are protruding and the other portions are contracted. Then, the molten glass is elongated and spun into a fiber while maintaining such a cross-sectional configuration substantially as it is.

According to the nozzle tip of the present invention, glass fibers having various deformed cross-sections are obtained. Of these glass fibers of the present invention, to speak of the glass fibers having deformed flat cross-sections, since such a glass fiber has a larger specific surface area than the conventional glass fiber having a circular cross-section, total adhesion forces between the glass fiber and resin are increased to improve a reinforcing effect. Also, the present glass fibers can be arranged mutually in such a manner that the protruding portions in the cross-section of one glass fiber fits into the recessed portions in the cross-section of another glass fiber, or that the glass fibers are closely placed one above another as with block stacking, thereby increasing an amount of the glass fibers filled. This, in combination with the above improvement in the reinforcing effect due to the increased adhesion forces, improves remarkably mechanical properties such as bending strength, bending elasticity and Izod impact strength. Further, because of having a flat cross-section, the glass fiber of the present invention develops a similar effect to that obtained by glass flakes in terms of anisotropy. Thus, a shrinkage rate and the coefficient of linear expansion of moldings can be each reduced in its anisotropy so as to avoid warps, and surface ruggedness, roughness and raised reinforcements in moldings can be also reduced, thereby providing a good appearance.

BRIEF DESCRIPTION OF THE DRAWINGS

FIG. 1 is a schematic side view of an entire apparatus for manufacturing a typical glass fiber.

FIG. 2 is a sectional view of a principal portion of the apparatus shown in FIG. 1.

DETAILED DESCRIPTION OF THE PREFERRED EMBODIMENTS

Figure 3:
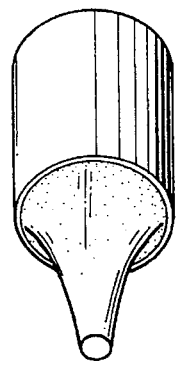
FIG. 3 is a perspective view showing a condition of glass spinning by a usual nozzle tip.

Hereinafter, various embodiments of the present invention will be described with reference to the drawings. FIG. 1 is a schematic side view of an entire apparatus for manufacturing a typical glass fiber, and FIG. 2 is a sectional view of a principal portion of the apparatus. An orifice plate 2 having a number of nozzle tips is disposed at the bottom of a bushing 1, and molten glass 3 in the bushing 1 comes out of the nozzle tips to be formed into filaments 4. A sizing agent is applied to the filaments 4 from a sizing agent applying roller 5, and the filaments 4 are then gathered into one or plural strands 7 through a gathering roller 6. Thereafter, the strands 7 are wound over a spindle 10 of a winder 8 while being traversed by a traversing device 9.

Figure 4:
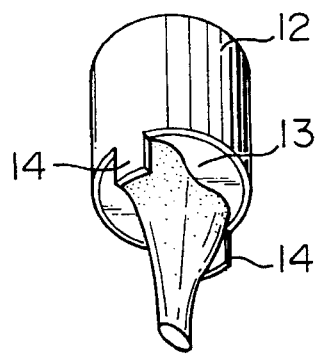
FIG. 4 is a perspective view showing a condition of glass spinning by a nozzle tip according to one embodiment of the present invention.
Figure 5A:
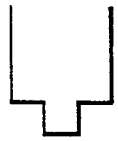
FIG. 5 is a projection view of the nozzle tip of the present invention, showing various examples of projected edges.
Figure 5B:
Figure 5C:
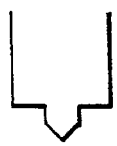
Figure 5D:
Figure 5E:
Figure 5F:
Figure 5G:
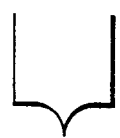
Figure 5H:
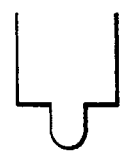

According to the present invention, a configuration of each nozzle tip in the above apparatus is improved to manufacture glass fibers having deformed cross-sections. FIG. 4 shows one embodiment of the present invention, as suggested before, in which a nozzle tip 12 has one cylindrical orifice 13 at its center, and a pair of projected edges 14, 14 facing each other are extended to project downwardly from the nozzle distal end at its outer peripheral wall. The molten glass is caused to flow out of the nozzle tip thus constructed such that a flow coming out of the orifice center is attracted toward flows descending along the projected edges 14, 14, with the result of a filament having a cross-section in which opposite portions in contact with the projected edges 14, 14 are protruding outwardly. Then, the molten glass is quenched and hardened at the distal ends of the projected edges to produce a glass fiber having a deformed cross-section which is relatively flat such as being oval, elliptic or cocoon-shaped.

While the pair of projected edges 14, 14 are arranged in opposite relation in the above embodiment, the number of the projected edges is not limited to two, but it may be set to any suitable number so that a glass fiber having a polygonal cross-section corresponding to the set number is produced. However, if the outer peripheral wall of the nozzle tip is entirely extended to form one annular projected edge, a flow coming out of the orifice center would be attracted and joined to an annular flow descending along an inner peripheral wall of the annular projected edge. Therefore, the produced fiber glass becomes circular in its cross-section and the provision of the projected edge has no contribution in forming the deformed cross-section.

The distal end of each of the projected edge can be of various configurations such as being rectangular, triangular, trapezoidal, other polygonal, or part of an oval or ellipse, as shown in projected views of FIGS. 5(a) to (h), and a size of each projected edge has no limitations.

Figure 6:
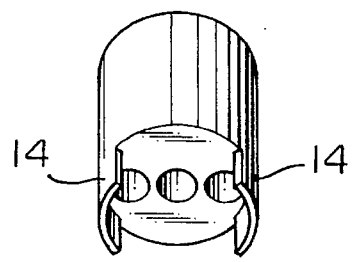
FIG. 6 is a perspective view showing an embodiment of the nozzle tip according the present invention in which three orifices are arranged in line.

The number of the orifices provided in the nozzle tip is not limited to one, and it is not necessarily required to be the same as the number of the projected edges like the embodiment of FIG. 6. In particular, providing the plural orifices rather than one is more advantageous in stably obtaining the deformed cross-section. The surface in which the orifices are opened is not limited to be flat, but may be concave or convex. In the case of the concave surface, it may be cone-shaped with the cone top positioned at the nozzle center. Further, the cross-sectional configuration of each orifice is not limited to a circle, but may be of a rectangular, oval, elliptic or any other desired shape.

Figure 7A:
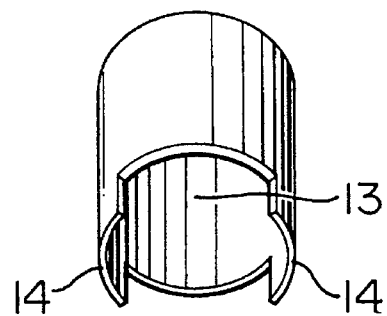
FIG. 7a is a perspective view showing the same nozzle tip as shown in FIG. 4.
Figure 7B:
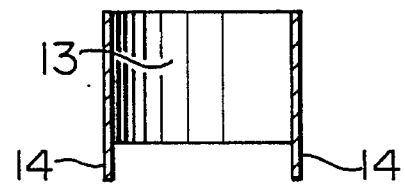
FIG. 7b is an axial sectional view the nozzle tip.
Figure 8A:
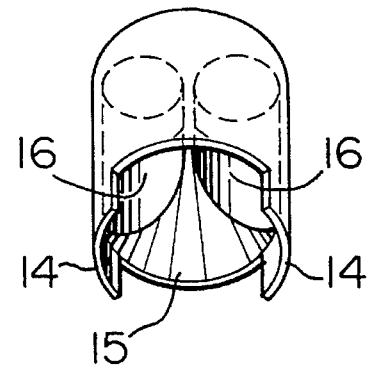
FIG. 8a is a perspective view showing another embodiment of the present invention in which the distal end of the nozzle tip is formed to have a concave surface.
Figure 8B:
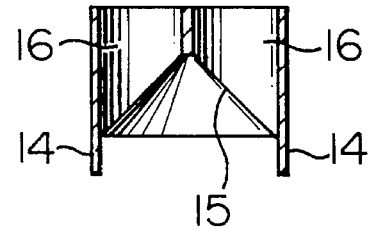
FIG. 8b is an axial sectional view of the nozzle tip.
Figure 9A:
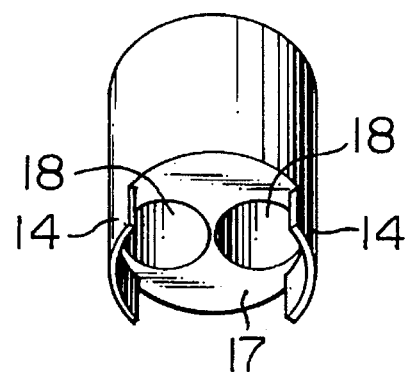
FIG. 9a is a perspective view showing a still other embodiment of the present invention in which the distal end of the nozzle tip is formed to have a flat surface.
Figure 9B:
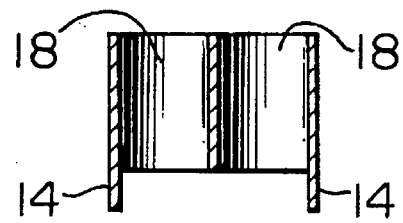
FIG. 9b is an axial sectional view of the nozzle tip.
Figure 10A:
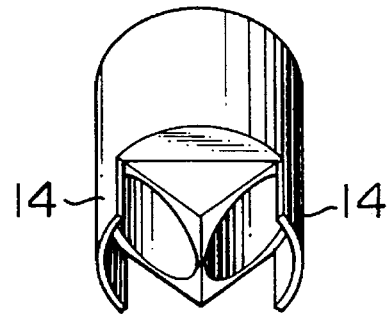
FIG. 10a is a perspective view showing an embodiment of the present invention in which the distal end of the nozzle tip is formed to have a convex surface being V-shaped in an axial section.
Figure 10B:
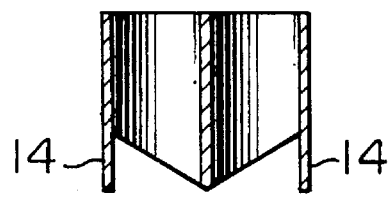
FIG. 10b is an axial sectional view of the nozzle tip.
Figure 11A:
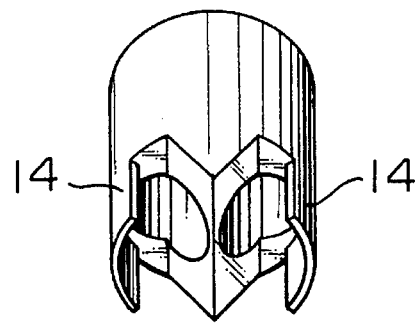
FIG. 11a is a perspective view showing an embodiment of the present invention in which the distal end of the nozzle tip is formed to have a convex surface being V-shaped in an axial section and flat surfaces on both sides of the convex surface.
Figure 11B:
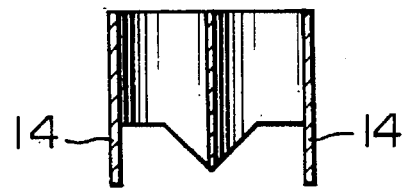
FIG. 11b is an axial sectional view of the nozzle tip.
Figure 12A:
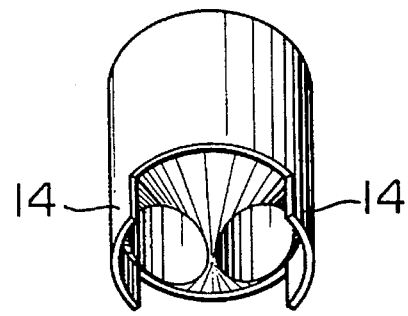
FIG. 12a is a perspective view showing an embodiment of the present invention in which the distal end of the nozzle tip is formed to have a conical convex surface.
Figure 12B:
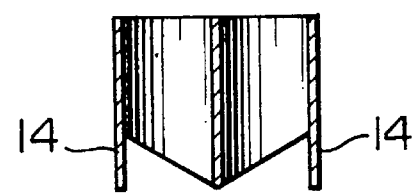
FIG. 12b is an axial sectional view of the nozzle tip.

For spinning a glass fiber of which cross-sectional configuration is oval, elliptic or cocoon-shaped, it is preferable that one nozzle includes one or two orifices and two projected edges. FIGS. 7a and 7b show an arrangement including one orifice 13 and two projected edges 14, 14 similarly to FIG. 4; FIGS. 8a and 8b show an arrangement including two orifices 16, 16 made open in a cone-shaped concave surface 15 at the nozzle distal end and two projected edges 14, 14; and FIGS. 9a and 9b show an arrangement including two orifices 18, 18 made open in a flat surface 17 at the nozzle distal end and two projected edges 14, 14. Further, FIGS. 10a and 10b, 11 and 12 show different embodiments that two orifices and two projected edges are provided, and the nozzle distal end surface in which the orifices are open is of a V-shaped convex surface, combination of a V-shaped convex surface and flat surfaces on both sides of the former, and a conical surface, respectively.

Figure 13A:
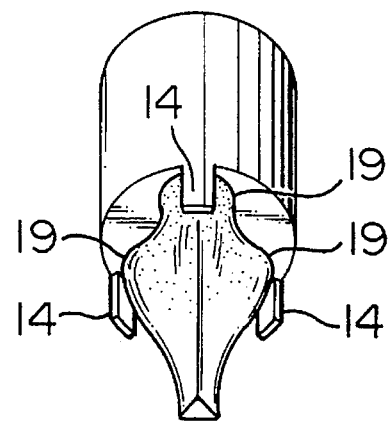
FIG. 13a is a perspective view showing an embodiment of the nozzle tip according to the present invention which has three projected edges and three orifices, and also showing a condition of glass flowing out of the nozzle tip.
Figure 13B:
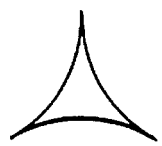
FIG. 13b is a cross-sectional view of a glass fiber spun through the nozzle tip.
Figure 14A:
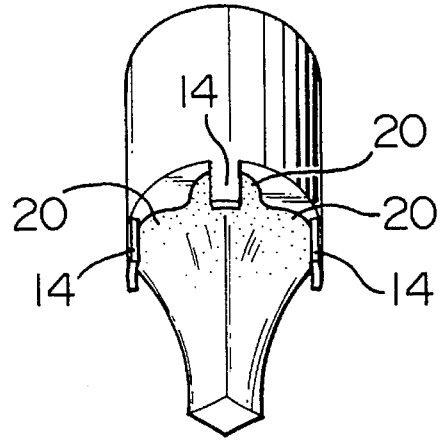
FIG. 14a is a perspective view showing an embodiment of the nozzle tip according to the present invention which has four projected edges and four orifices, and also showing a condition of glass flowing out of the nozzle tip.
Figure 14B:
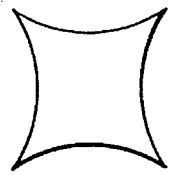
FIG. 14b is a cross-sectional view of a glass fiber spun through the nozzle tip.

A glass fiber having a deformed cross-section which is polygonal can be produced as follows. For example, by providing three orifices 19 and three projected edges 14 for each nozzle tip, as shown in FIG. 13a, a glass fiber having a substantially triangular cross-section as shown in FIG. 13b can be obtained. Also, by providing four orifices 20 and four projected edges 14 for each nozzle tip, as shown in FIG. 14a, a glass fiber having a substantially rectangular cross-section as shown in FIG. 14b can be obtained. In this way, glass fibers having polygonally deformed various cross-sections can be produced by suitably selecting the number of the orifices and the number of the projected edges 14 which are provided for each nozzle tip.

Figure 18A:
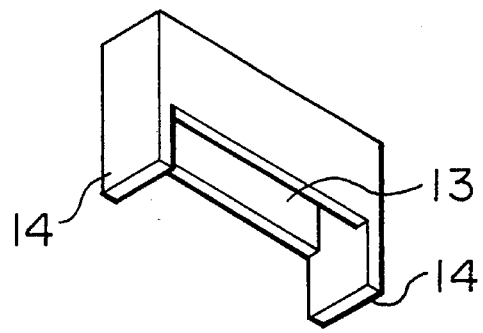
FIG. 18a is a perspective view showing an embodiment of the present invention in which a cross-section of the nozzle tip is rectangular.

The glass fiber having a deformed cross-section of the present invention may have any desired cross-sectional configuration. Thus, there can also be produced glass fibers having other various deformed cross-sections in addition to the above embodiments. For example, by forming each nozzle tip to have its cross-sectional configuration made up of three rectangles radially extending from the center in three directions with angular intervals of 120 degrees therebetween and providing the projected edges 14 at the peripheral ends of the three rectangles, as shown in FIG. 21a, a glass fiber having a Y-shaped cross-section as shown in FIG. 21b can be obtained. Also, by forming each nozzle tip to include a rectangular orifice 13 and two projected edges 14 at opposite short sides thereof, as shown in FIG. 18a, and properly adjusting spinning conditions such as a spinning temperature and a spinning speed, glass fibers having various deformed cross-sections as shown in FIGS. 22a, 22b, 22c, 22d, 22e and 22f can be obtained. As illustrated in FIGS. 18a–21b, the nozzle tips do not necessarily have to have a cylindrical configuration. However, the tips do have a circumferentially closed outer perimeter at a distal end thereof. A plurality of projections 14 depend downwardly and only axially from the closed outer perimeter. In other words, projections 14 do not include a radial component.

In considering a transformation ratio of the glass fiber having a deformed flat cross-section and a reinforcing effect resulted from using it, a ratio of maximum length to minimum width in such a flat cross-section is required to be not less than 2.3 in the glass fiber having a deformed cross-section of the present invention. If the ratio of maximum length to minimum width in the cross-section is less than 2.3, an anisotropy of each of the shrinkage rate and the coefficient of linear expansion of moldings would be so increased as to cause the problem of warps, and an appearance would be worsened due to the occurrence of surface ruggedness, roughness and raised reinforcements in moldings. The ratio of maximum length to minimum width in the cross-section should preferably be within the range of from 2.4 to 30.0, more preferably within the range of from 2.4 to 12.0, most preferably within the range of from 10.0 to 12.0. If the ratio of maximum length to minimum width in the cross-section is extremely large, glass fibers might be fractured due to the load imposed on the glass fibers during steps of mixing with resin and molding of the mixture, thereby degrading the reinforcing effect.

While the glass fiber having a deformed cross-section of the present invention can be of any desired thickness, it is preferable that the minimum width in the cross-section be within the range of from 0.5 to 25 μm and the maximum length in the cross-section be within the range of from 1.2 to 300 μm. If the glass fiber is too thin, difficulties would be raised in spinning the glass fiber. If it is too thick, the reinforcing effect resulted by the glass fibers as reinforcements would be degraded for such a reason as a reduction in the contact area with resin.

The glass fiber may have any suitable composition so long as the composition is able to produce a glass fiber from molten glass. A preferable composition includes, for example, E glass composition, C glass composition, S glass composition, or alkali-resistant glass composition.

It is desirable that the glass fiber having a deformed cross-section of the present invention be subjected to surface treatment by using, for example, a silane coupling agent such as γ-methacrylic oxypropyl trimethoxysilane, γ-glycidoxypropyl trimethoxysilane, or γ-aminopropyl triethoxysilane. An amount of the silane coupling agent should preferably be not less than 0.01 weight % of the total glass fiber weight. Furthermore, as occasion demands, the glass fiber may be subjected to surface treatment by additionally using, for example, a lubricant such as a compound of fatty acid and amido or silicone oil, an antistatic agent such as a quaternary ammonium salt, resin such as epoxy or urethane resin having an ability to form a coating, a mixture of such resin having an ability to form a coating and a thermal stabilizer, or a flame retarder.

The glass fiber having a deformed cross-section of the present invention is suitably used as reinforcements for thermoplastic resins. It is particularly suitable as reinforcements for nylon, saturated polyester, polycarbonate, etc. A preferable amount by which the glass fiber of the present invention should be filled in such resin is within the range of from 5 to 70 weight %.

A method of manufacturing the glass fiber having a deformed cross-section of the present invention is carried out by spinning molten glass through the nozzle tip of the present invention as explained above. The present method imposes no special restrictions on spinning conditions such as a spinning speed and a temperature of the molten glass, as well as on equipment and apparatus for the manufacturing except the nozzle tip of the present invention. In other words, the present method can be practiced by using similar spinning conditions, equipment and apparatus to those which have been used to produce a conventional glass fiber having a circular cross-section. Under such conditions as using a bushing which has 400 nozzle tips and running at a spinning speed as high as 3000 m/min, for example, the glass fiber of the present invention can be manufactured almost comparably to a conventional glass fiber having a circular cross-section.

There exist no special limitations on the forms in which the glass fiber having a deformed cross-section of the present invention is used as a reinforcement. Thus, the glass fiber of the present invention can be employed as a reinforcement for thermoplastic resins in any of the forms such as chopped strands, rovings, glass strings or fabrics. To properly take advantage of the glass fiber having a deformed cross-section of the present invention, it is effective to use the glass fiber in the form of chopped strands. In the case of chopped strands, a cut length of the glass fiber having a deformed cross-section should preferably be within the range of from 1 mm to 100 mm, more preferably within the range of from 3 mm to 25 mm. If the fiber cut length is less than 1 mm, mechanical properties such as bending strength, bending elasticity and Izod impact strength would be insufficient to achieve the expected reinforcing effect. If it exceeds 100 mm, the advantage of the glass fiber having a deformed cross-section would not be resulted because of a reduction in fluidity of the chopped strands in resin and incapability of uniform dispersion thereof.

[Experimental Example 1]

Glass spinning was made by using a bushing for spinning glass fibers which included 400 nozzle tips of FIG. 7 having the projected edges 14 each being 3 mm high and 1 mm wide, under conditions of the spinning temperature of 1260° C. and the spinning speed of 3000 m/min. As a result, glass fibers each having a non-circular cross-section could be produced in which a transformation ratio of the fiber cross-section was 3.8.

[Experimental Example 2]

Glass spinning was made by using a bushing for spinning glass fibers which included 400 nozzle tips of FIG. 8 having the projected edges 14 each being 2 mm high and 1 mm wide, under conditions of the spinning temperature of 1220° C. and the spinning speed of 3000 m/min. As a result, glass fibers each having a non-circular cross-section could be produced in which a transformation ratio of the fiber cross-section was 5.8. During the spinning for 3 hours, there occurred no breakage of the fibers.

[Experimental Example 3]

Glass spinning was made by using a bushing for spinning glass fibers which included 400 nozzle tips of FIG. 9 having the projected edges 14 each being 2 mm high and 1 mm wide, under conditions of the spinning temperature of 1220° C. and the spinning speed of 3000 m/min. As a result, glass fibers each having a non-circular cross-section could be produced in which a transformation ratio of the fiber cross-section was 7.3.

[Experimental Example 4]

Glass spinning was made by using a bushing for spinning glass fibers which included 400 nozzle tips each having a pair of projected edges 14, each 2 mm high and 1 mm wide, extending downwardly from an outer periphery of the nozzle distal end and four orifices arranged in line between the projected edges, under conditions of the spinning temperature of 1220° C. and the spinning speed of 3000 m/min. As a result, glass fibers each having a non-circular cross-section could be produced in which a transformation ratio of the fiber cross-section was 11.2.

[Experimental Example 5]

Glass spinning was made by using a bushing for spinning glass fibers which included nozzle tips of FIG. 10 having the projected edges 14 each being 2 mm high and 1 mm wide, under conditions of the spinning temperature of 1220° C. and the spinning speed of 3000 m/min. As a result, glass fibers each having a non-circular cross-section could be produced in which a transformation ratio of the fiber cross-section was 7.3.

[Experimental Example 6]

Figure 18B:
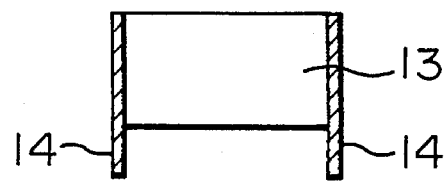
FIG. 18b is an axial sectional view of the nozzle tip.
Figure 22A:
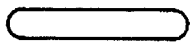
FIGS. 22a, 22b, 22c, 22d, 22e and 22f are schematic cross-sectional views of glass fibers having various deformed cross-sections which are spun through the nozzle tip of FIG. 18 by changing spinning conditions.
Figure 22B:
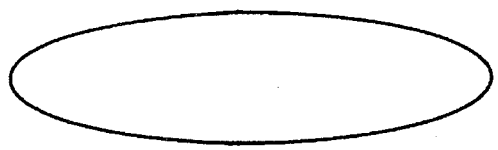
Figure 22C:
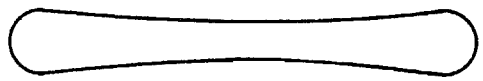

Glass spinning was made by using a bushing for spinning glass fibers which included 400 nozzle tips of FIG. 18 each being rectangular in its cross-section with a short side of 1.2 mm and a long side of 3 mm and having the projected edges 14, each 3 mm high and 1.2 mm wide, extending downwardly from the opposite short sides at the nozzle distal end, under conditions of the spinning temperature of 1260° C. and the spinning speed of 3000 m/min. As a result, glass fibers each having a non-circular cross-section which is defined by two rectilinear lines and two curves at both ends of the rectilinear lines, as schematically shown in FIG. 22a, could be produced in which a transformation ratio of the fiber cross-section was 6.3.

[Experimental Example 7]

Figure 19A:
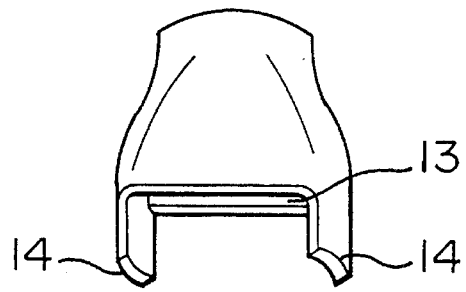
FIG. 19a is a perspective view showing an embodiment of the present invention in which a cross-section of the nozzle tip is circular in its upper portion and rectangular in its lower portion.
Figure 19B:
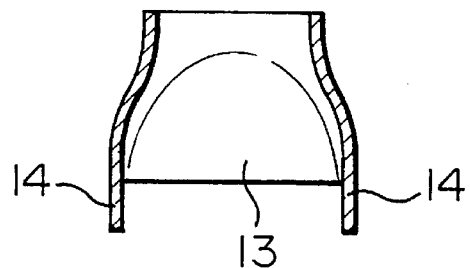
FIG. 19b is an axial sectional view of the nozzle tip.

Glass spinning was made by using a bushing for spinning glass fibers which included 400 nozzle tips of FIG. 19 each formed by crushing a lower portion of the same nozzle tip as that in Experimental Example 1 such that the nozzle tip has its lower portion substantially rectangular in its cross-section, under conditions of the spinning temperature of 1260° C. and the spinning speed of 3000 m/min. As a result, glass fibers each having a non-circular cross-section could be produced in which a transformation ratio of the fiber cross-section was 6.3.

[Experimental Example 8]

Figure 20A:
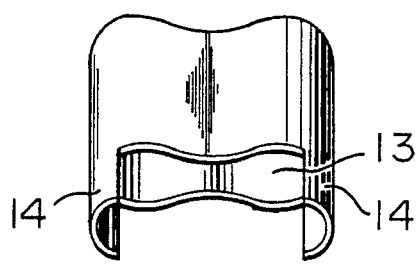
FIG. 20a is a perspective view showing an embodiment of the present invention in which a cross-section of the nozzle tip is cocoon-shaped.
Figure 20B:
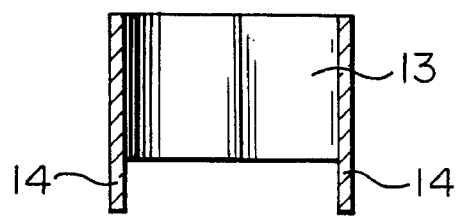
FIG. 20b is an axial sectional view of the nozzle tip.
Figure 21A:
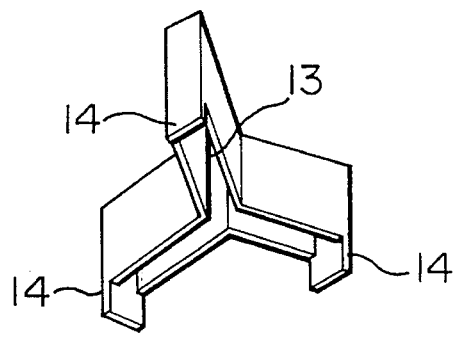
FIG. 21a is a perspective view showing an embodiment of the present invention in which the nozzle tip is shaped to have its cross-sectional configuration made up of three rectangles radially extending from the center in three directions with angular intervals of 120 degrees therebetween.
Figure 21B:
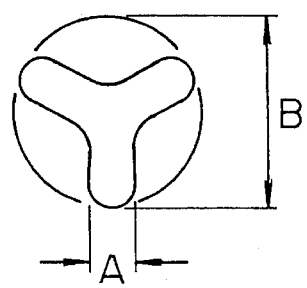
FIG. 21b is a cross-sectional view of a glass fiber spun through the nozzle tip.

Glass spinning was made by using a bushing for spinning glass fibers which included 400 nozzle tips of FIG. 20 each being cocoon-shaped in its cross-section and having the pair of projected edges 14, each 3 mm high and 1.2 mm wide, extending downwardly from the nozzle distal end, under conditions of the spinning temperature of 1260° C. and the spinning speed of 3000 m/min. As a result, glass fibers each having a non-circular cross-section could be produced in which a transformation ratio of the fiber cross-section was 6.8.

[Experimental Example 9]

Glass spinning was made by using a bushing for spinning glass fibers which included 400 nozzle tips of FIG. 21a each shaped to have its cross-sectional configuration made up of three rectangles radially extending from the center in three directions with angular intervals of 120 degrees therebetween and having the projected edges 14, each 3 mm high and 1.2 mm wide, at the peripheral ends of the three rectangles, under conditions of the spinning temperature of 1260° C. and the spinning speed of 3000 m/min. As a result, glass fibers each having a non-circular cross-section which is defined by six rectilinear lines and six curves interconnecting these six rectilinear lines, as shown in FIG. 21b, could be produced in which a ratio of A to B was 1:5.

[Experimental Example 10]

Figure 22D:
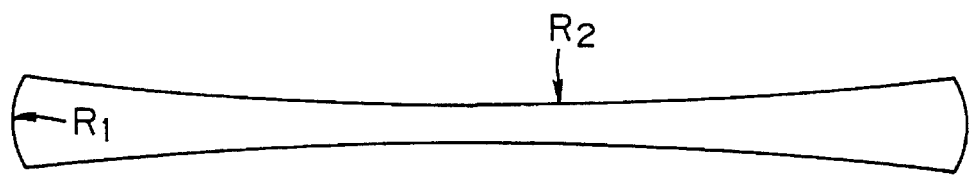
Figure 22E:
Figure 22F:
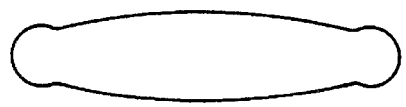

Glass spinning was made by using a bushing for spinning glass fibers which included 500 nozzle tips of FIG. 18 each being rectangular in its cross-section with a short side of 1.2 mm and a long side of 3.5 mm and having the projected edges 14, each 3.2 mm high, 1.3 mm wide and 0.5 mm thick, extending downwardly from the opposite short sides at the nozzle distal end, under conditions of the E glass composition, the spinning temperature of 1210° C. and the spinning speed of 1030 m/min. Surface treatment was carried out by depositing a sizing agent 0.35 weight % primarily consisted of γ-aminopropyl triethoxysilane. As a result, glass fibers each having a non-circular cross-section as schematically shown in FIG. 22d could be produced in which a ratio R2/R1 between the two radii of curvatures was about 19.

The spinning wad continued for 3 hours under the above conditions, but there occurred no breakage of the fibers.

[Comparative Example 1]

Figure 15A:
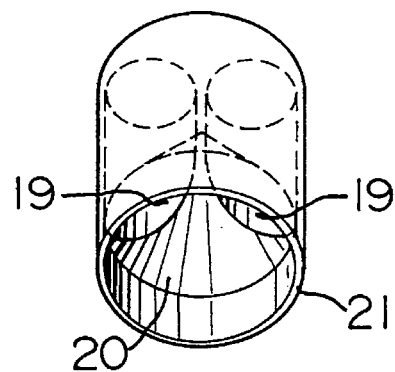
FIG. 15a is a perspective view of a comparative example in which the nozzle tip has an annular edge at its distal end.
Figure 15B:
FIG. 15b is an axial sectional view of the nozzle tip.

Glass spinning was made by using a bushing for spinning glass fibers which included 400 nozzle tips each formed, as shown in FIG. 15, such that the nozzle tip is provided with a conical recess 20 converging from its periphery toward the center, two orifices 19, 19 made open in the conical recess 20, and an annular edge 21, 2 mm high and 1 mm wide, formed to be partly contacted with the orifices, under conditions of the spinning temperature of 1220° C. and the spinning speed of 1800 m/min. As a result, glass fibers each having a non-circular cross-section could be produced in which a transformation ratio of the fiber cross-section was 1.6 at maximum. However, the glass fiber coming out of the nozzle tip tended to deviate toward one side of the annular edge, bringing about a very unstable state during the spinning, and the glass fiber having a deformed cross-section could not be stably produced.

[Comparative Example 2]

Figure 16A:
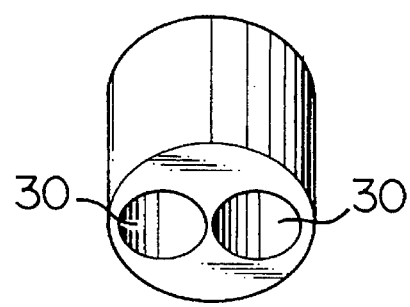
FIG. 16a is a perspective view of a comparative example in which the nozzle tip has no projected edges at its distal end.
Figure 16B:
FIG. 16b is an axial sectional view of the nozzle tip.
Figure 17:
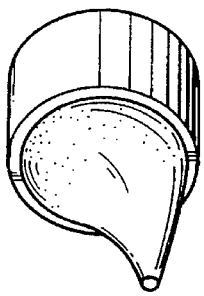
FIG. 17 is a perspective view showing a condition of glass flowing out of the nozzle tip in the comparative example of FIG. 15.

Glass spinning was made by using a bushing for spinning glass fibers which included 400 nozzle tips each formed, as shown in FIG. 16, similarly to the nozzle tip in Experimental Example 3 (FIG. 9) except that the projected edges 14, 14 were removed away from the nozzle tip in Experimental Example 3, under conditions of the spinning temperature of 1220° C. and the spinning speed of 3000 m/min. As a result, glass fibers each having a non-circular cross-section could be produced in which a transformation ratio of the fiber cross-section was 1.4 at maximum. However, there occurred such a wetting phenomenon that the glass coming out of the nozzle tip was spread from the distal end of the nozzle tip over an orifice plate, resulting in degradation of working efficiency and instability in configuration of the fiber cross-section.

[Comparative Example 3]

Glass spinning was made by using a bushing for spinning glass fibers which included nozzle tips each being the same as the nozzle tip in Experimental Example 5 (FIG. 10) except that the projected edges were removed away from the distal end of the nozzle tip, under conditions of the spinning temperature of 1220° C. and the spinning speed of 3000 m/min. As a result, glass fibers in each of which the fiber cross-section had a transformation ratio of 1.5 could be produced. However, some of the produced glass fibers was elliptic in cross-section or had a circular cross-section because molten glass filaments coming out of the two orifices could not be joined together and remained separate from each other.

The above results are summarized in Table 1 below.

efficiency. In addition, the glass fiber having a deformed cross-section adapted for intended application can be manufactured by properly changing the nozzle tip and the plural projected edges in configuration and number thereof.

What is claimed is:

1. A nozzle tip for spinning a glass fiber having a non-circular cross-section wherein said
   tip has a closed outer perimeter at a distal end thereof;
   a plurality of projections depending only axially from said closed outer perimeter, each of said projections being formed with a flat lower end; and
   at least one orifice being disposed within said tip.

2. A nozzle tip according to claim 1, wherein said projection plurality of projections comprise a pair of projections which face each other, and said at least one orifice is arranged on a rectilinear line connecting between said pair of projections.

3. A nozzle tip according to claim 2, wherein the number of said at least one orifice is two.

TABLE 1

|  | Unit | Experimental Example | | | | | | | | | | Comparative Example | | |
|---|---|---|---|---|---|---|---|---|---|---|---|---|---|---|
|  |  | 1 | 2 | 3 | 4 | 5 | 6 | 7 | 8 | 9 | 10 | 1 | 2 | 3 |
| Width of projected edge | mm | 3 | 2 | 2 | 2 | 2 | 3 | 3 | 3 | 3 | 3.2 | annular edge | — | — |
| Height of projected edge | mm | 1 | 1 | 1 | 1 | 1 | 1.2 | 1 | 1.2 | 1.2 | 1.3 |  | — | — |
| Per nozzle Number of orifices | piece | 1 | 2 | 2 | 4 | 2 | 1 | 1 | 1 | 1 | 1 | 2 | 2 | 2 |
| Number of projected edges | piece | 2 | 2 | 2 | 2 | 2 | 2 | 2 | 2 | 3 | 2 | 0 | 0 | 0 |
| Shape of orifice surface | — | — | — | concave | flat | flat | convex | — | — | — | — | — | concave | flat | convex |
| Spinning temp. | °C. | 1260 | 1220 | 1220 | 1220 | 1220 | 1220 | 1260 | 1260 | 1260 | 1210 | 1220 | 1220 | 1220 |
| Spinning speed | m/min | 3000 | 3000 | 3000 | 3000 | 3000 | 3000 | 3000 | 3000 | 3000 | 1030 | 1800 | 3000 | 3000 |
| Transformation ratio of cross-section |  | 3.8 | 5.8 | 7.3 | 11.2 | 10.0 | 6.3 | 6.3 | 6.8 | B/A = 5 | R2/R1 = 19 | 1.6 | 1.4 | 1.5 |
| Note |  | FIG. 7 | FIG. 8 | FIG. 9 | — | FIG. 10 | FIG. 18 | FIG. 19 | FIG. 20 | FIG. 21 | FIG. 18 | FIG. 15 | FIG. 16 |  |

According to the present invention, since a plurality of projected edges are provided on a nozzle tip to extend downwardly from the distal end of the nozzle tip at its outer periphery, molten glass is caused to flow downwardly along inner surfaces of the projected edges, thereby attracting and joining together molten glass coming out of the center of an orifice so that a glass fiber having a deformed cross-section can be stably obtained which has protrusions corresponding to the projected edges. Particularly, a transformation ratio of the fiber cross-section has a high value which has not been achieved in the past, and this value can be further raised by providing a plurality of orifices in the nozzle tip. The transformation ratio of the glass fiber having a deformed cross-section should preferably be not less than 2.4 in order to improve a reinforcing effect and increase an amount of glass fibers filled when they are used as reinforcements for plastics, but not more than 12 for not reducing the strength of the glass fibers themselves. By using the nozzle tip of the present invention, the glass fiber having a deformed cross-section of which transformation ratio is within the preferable range from 2.4 to 12 can be stably produced at a spinning speed as high as 3000 m/min without lowering production 4. A nozzle tip according to claim 2, wherein the number of said at least one orifice is three.

5. A nozzle tip according to claim 1, wherein said nozzle tip has a distal axial end surface in which said at least one orifice is located, said axial end surface being a concave surface.

6. A nozzle tip according to claim 1, wherein said nozzle tip has a distal axial end surface in which said at least one orifice is located, said axial end surface being a convex surface.

7. A nozzle tip according to claim 1, wherein there are three of said projections that are disposed in circumferentially equally spaced relation with respect to one another.

8. A nozzle tip according to claim 1, wherein there are four of said projections that are disposed in circumferentially equally spaced relation with respect to one another.

9. A nozzle tip according to claim 1, wherein said nozzle tip has a distal axial end surface in which said at least one orifice is located, said axial end surface being a flat surface.

* * * * *